United States Patent [19]
Matson

[11] 3,754,438
[45] Aug. 28, 1973

[54] LOAD MEASURING DEVICE
[75] Inventor: William U. Matson, Oxon Hill, Md.
[73] Assignee: The United States of America as represented by the Secretary of the Navy, Washington, D.C.
[22] Filed: May 25, 1972
[21] Appl. No.: 256,865

[52] U.S. Cl. .................................. 73/141 A, 338/5
[51] Int. Cl. ............................................. G01l 1/22
[58] Field of Search ................. 73/141, 143; 338/5; 177/211

[56] References Cited
UNITED STATES PATENTS
2,582,886   1/1952   Ruge............................... 73/141 A
3,548,650  12/1970   Boadle............................. 73/141 A Primary Examiner—Charles A. Ruehl
Attorney—R. S. Sciascia, Arthur L. Branning et al.

[57] ABSTRACT

This disclosure is directed to a load bearing fixture and more particularly to a fixture to which strain gauges may be secured to detect small changes in load compared to the load. The fixture is further suitable for handling overloads which are many times that of the load.

4 Claims, 3 Drawing Figures

3,754,438

LOAD MEASURING DEVICE

BACKGROUND OF THE INVENTION

This invention is directed to a device for measuring loads on a system and more particularly to a device for measuring small changes in load which provides for overloads of many times the load being measure.

Heretofore, load measuring devices have been used. Many types are spring devices, rods, and a parallelogram type such as shown in U.S. Pat. Nos. 3,004,231 and 3,135,112.

SUMMARY OF THE INVENTION

The device of this invention is extremely sensitive to load changes by use of strain gages on separate load bearing arms. The device is provided with an adjustable means for preloading a certain weight-load on the device and a safety means for preventing loss of load in case the load bearing arms fail. The device may be used under conditions which may bring about large load surges without damage to the device.

STATEMENT OF THE OBJECTS

It is an object of the present invention to provide a sensitive detector system for determining small load changes.

Another object is to provide a system in which loads may be monitored while avoiding twisting of the load bearing device.

Yet another object is to provide a device which may be adjusted for very light loads or relatively heavy loads.

Still another object is to set forth a load measuring device which is provided with a built in overload mechanism for protection of the load measuring device.

Other objects and advantages will become obvious from a reading of the following specification when considered with the drawings.

DETAILED DESCRIPTION OF THE DRAWINGS

Figure 1:
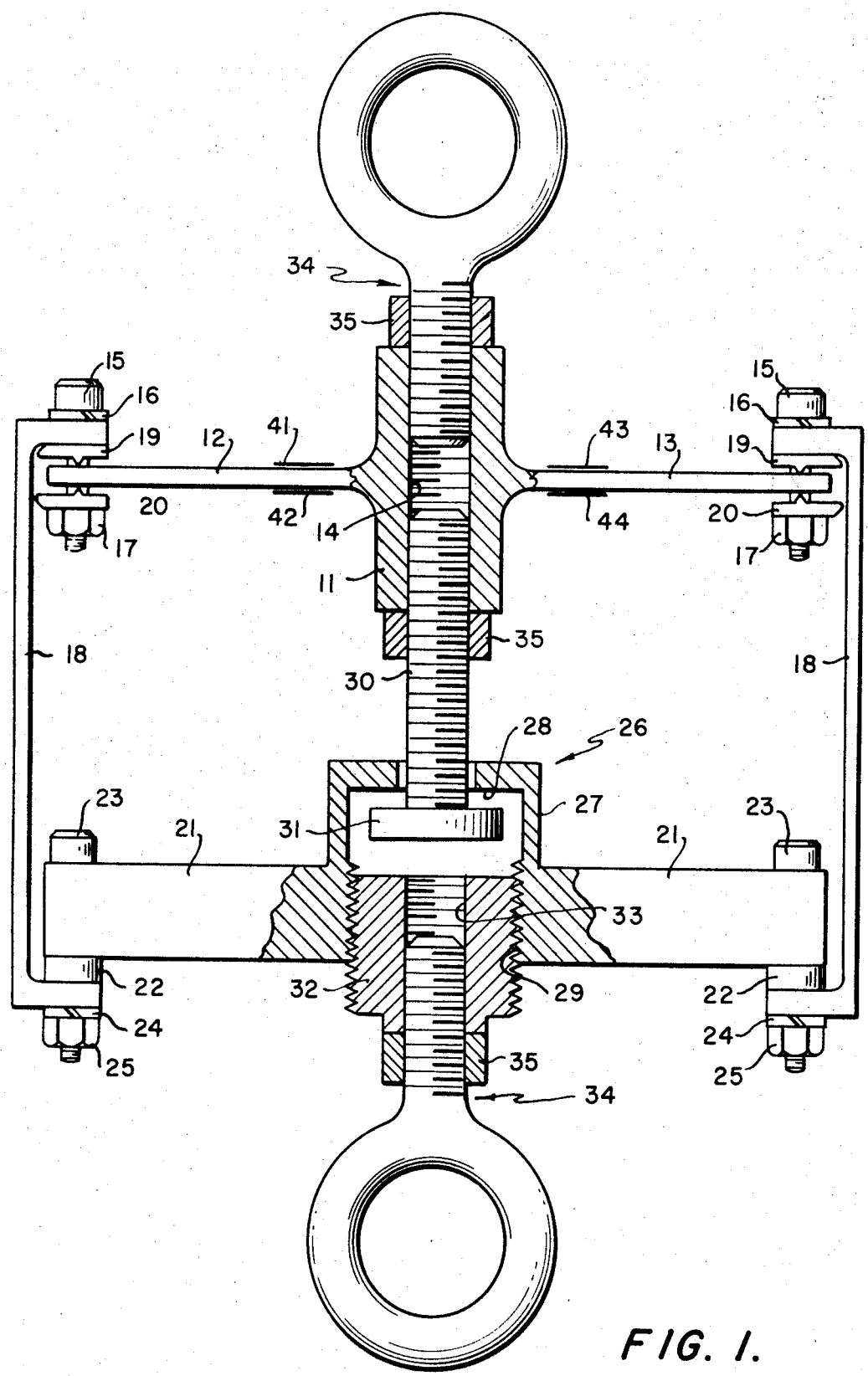
FIG. 1 is a front view partially in section to better illustrate some of the elements.
Figure 2:
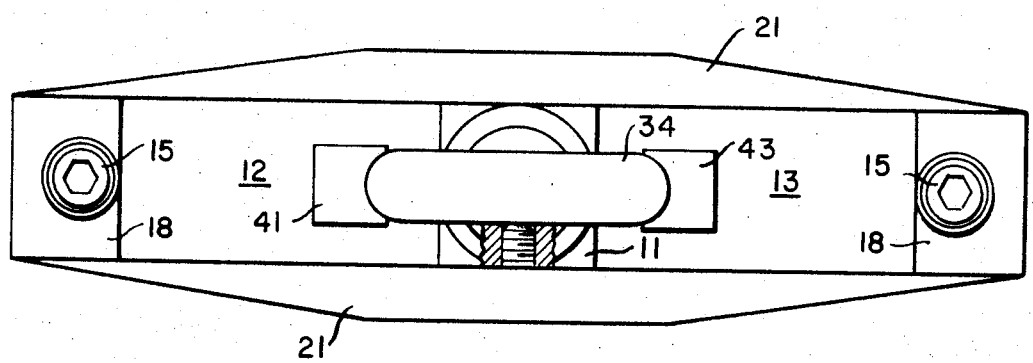
FIG. 2 is a top view.

Now referring to the drawings, there is shown by illustration the various elements of the device and their relationship to each other. The device includes a central round or square hub 11 from which cantilevers 12 and 13 extend directly opposite from each other on a horizontal or perpendicular to the hub with their centers 180 degrees apart. The cantilevers are rectangular in cross section with their thickness much thinner than their width. The thickness depends upon the loads to be measured. The hub is provided with an axially threaded aperture 14 whose axis is substantially perpendicular with the cantilevers. The outer ends of the cantilevers are provided with an aperture through which bolts 15 pass and are secured in place by suitable lock washers 16 and nuts 17.

Figure 3:
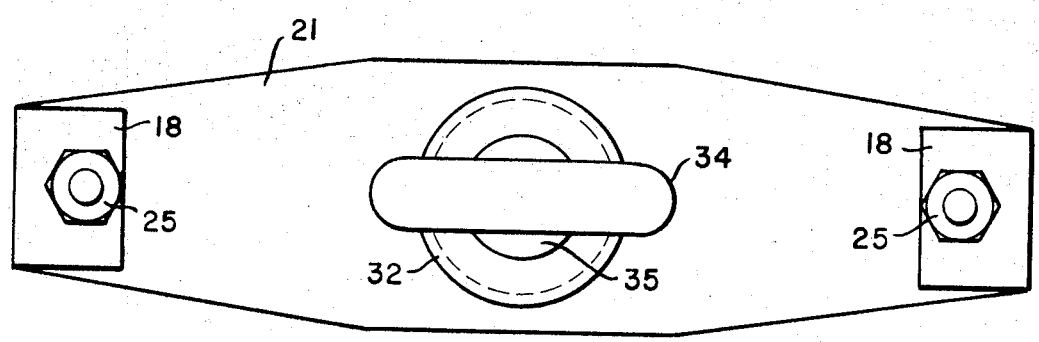
FIG. 3 is a bottom view.

A U-shaped plate 18 is secured to the cantilevers by bolts 15 and is supported upon an upper fulcrum 19 with a lower fulcrum 20 between the nut and the cantilever. The lower end of the u-plate 18 supports a thick cross plate or bar 21 which is parallel with the cantilevers, of the same overall length, rests upon a spacer 22 and is secured in place by bolts 23 by use of lock washers 24 and nuts 25. The bolts 15 and 23 are so positioned and the u-plates are secured such that they are parallel. The thick plate 21 is of the same width at the ends as the U-plates and the cantilevers; however, the width widens toward the center as shown in FIGS. 1 and 3. The central portion of the cross plate 21 is of double thickness to include a central square section 26 that is milled-out to have thin upright walls 27 and top 28. The main central portion of the cross plate is drilled and threaded with the threaded hole 29 of greater diameter than the hub 11 but of smaller diameter than the milled-out section. The top wall 28 of the upper section has an aperture therethrough axially aligned with the threaded aperture 14 in the hub. A threaded stud 30 that has a head or flange 31 on the lower end is inserted through threaded aperture 29 up through the aperture in the upper section and threaded into the threaded aperture in the hub with the flange within the milled out section. A lock nut may be provided to secure the threaded stud in place against the hub. A threaded plug 32 is threaded into aperture 29 and is provided with an axially aligned threaded aperture 33 within which a threaded screw eye 34 is threaded. The screw eye is secured into place by use of a locking nut 35. The upper end of the hub has a screw eye 34 threaded into the hub and is locked in place by a locking nut 35.

In order to measure the load carried by the load measuring assembly, strain gages 41–44 are secured to the cantilever bars. The strain gages are secured one above and below the other on opposite sides of the hub and connected electrically into a Wheatstone bridge circuit with any suitable measuring meter in order to measure the deflections of the cantilever due to load. Wheatstone bridge circuits are well known in the art, therefore, the circuit has not been shown. The electrical output measuring device may be calibrated in any manner such as by adding known weights to measure the load.

The threaded plug 32 and threaded stud 30 cooperate to provide a set preload and/or overload protection means. With the hub and cantilevers as the top, the cantilevers will bend downwardly under load. Therefore, the load will be determined by the deflection of the cantilevers with corresponding bending of the strain gages. Since the flange of stud 30 is within the milled-out section on the lower bar, the flange will remain stationary as the milled-out section moves downward under load. When the flange supports the upper wall 28 of the milled-out section, the weight will be carried by the wall 28, by the stud 30, the hub 11, and the eye bolts 34; therefore, the cantilevers will no longer be deflected due to load.

A set preload may be set by rotation of plug 32 until it is forced against the bottom of flange 31 on stud 30 and continued rotating the plug thereby forcing the load bar downwardly until a preload is registered. Then a load on the eyebolt will not begin to register on the load measuring meter until the load exceeds that which has been preloaded into the device. Once the load is applied, the flanged stud then acts to prevent an overload. The over load factor is determined by the position at which the flange is set. The stud may be threaded into the hub for small overload values and threaded outward of the hub for greater overload values. Therefore, the load measuring device may be used to set a preload value into the assembly as well as an overload value.

In operation, the device is assembled and the stud 30 is threaded into hub 11 until the flange floats between the upper wall 28 and the top of plug 32 without any weight on it. The output measurement of the strain gages are adjusted to zero. The assembly is now ready for application of the load pull on the eye bolt. As the weight is added or the pull is applied, the cantilever bars will be deflected downwardly permitting the lower bar to lower with respect to flange 31 on the stud 30. If the stud has been properly set, the upper surface of the flange will meet with the upper wall surface upon reaching the maximum set load. The output of the strain gages denote the weight or load applied.

The assembly may be made of a material that will withstand the weight or pull required. In some instances the device may be used in water salt or fresh for towing purposes or for securing buoys in place. Therefore, the device may be made of stainless steel and/or treated for resistance to the water by use of a suitable coating.

Obviously many modifications and variations of the present invention are possible in the light of the above teachings. It is therefore to be understood that within the scope of the appended claims the invention may be practiced otherwise than as specifically described.

What is claimed is:

1. A load measuring device which comprises:
   a support hub,
   a pair of oppositely disposed identical cantilevers extending from said support hub,
   a load bearing bar,
   means supported by the outer end of said cantilevers supporting said load bearing bar parallel with said cantilevers,
   said means supporting said load bearing bar parallel with said cantilevers including a fulcrum means which coacts with the outer end of said cantilevers to permit vertical movement of said cantilevers,
   means for supporting said device in place by said hub,
   means for securing a load from the center of said load bearing bar, and
   a pair of strain gages secured to each of said cantilevers equi-distant from said hub with one strain gage of said pair on the upper surface of said cantilever and one on the lower surface thereof,
   said strain gages electrically wired for operation as a Wheatstone bridge for determining load supported by said device.

2. A load measuring device as claimed in claim 1; in which,
   said load bearing bar includes an axially aligned hollow section,
   a stud screw threaded into said hub coaxial therewith,
   said stud including a flange on its free end,
   said flange assembled within said hollow section whereby the flange cooperates with said hub and said hollow section to provide an overload protector.

3. A load measuring device as claimed in claim 2; wherein,
   said stud is adjustable relative to said hub and said hollow section for providing different overload values.

4. A load measuring device as claimed in claim 3; which includes,
   an adjustable means in axial alignment with said stud for combining therewith to adjust for different preload settings.

* * * * *